Aug. 24, 1948.    F. G. SCHWALBE    2,447,962
CUTOFF MACHINE
Filed May 31, 1943    3 Sheets-Sheet 1
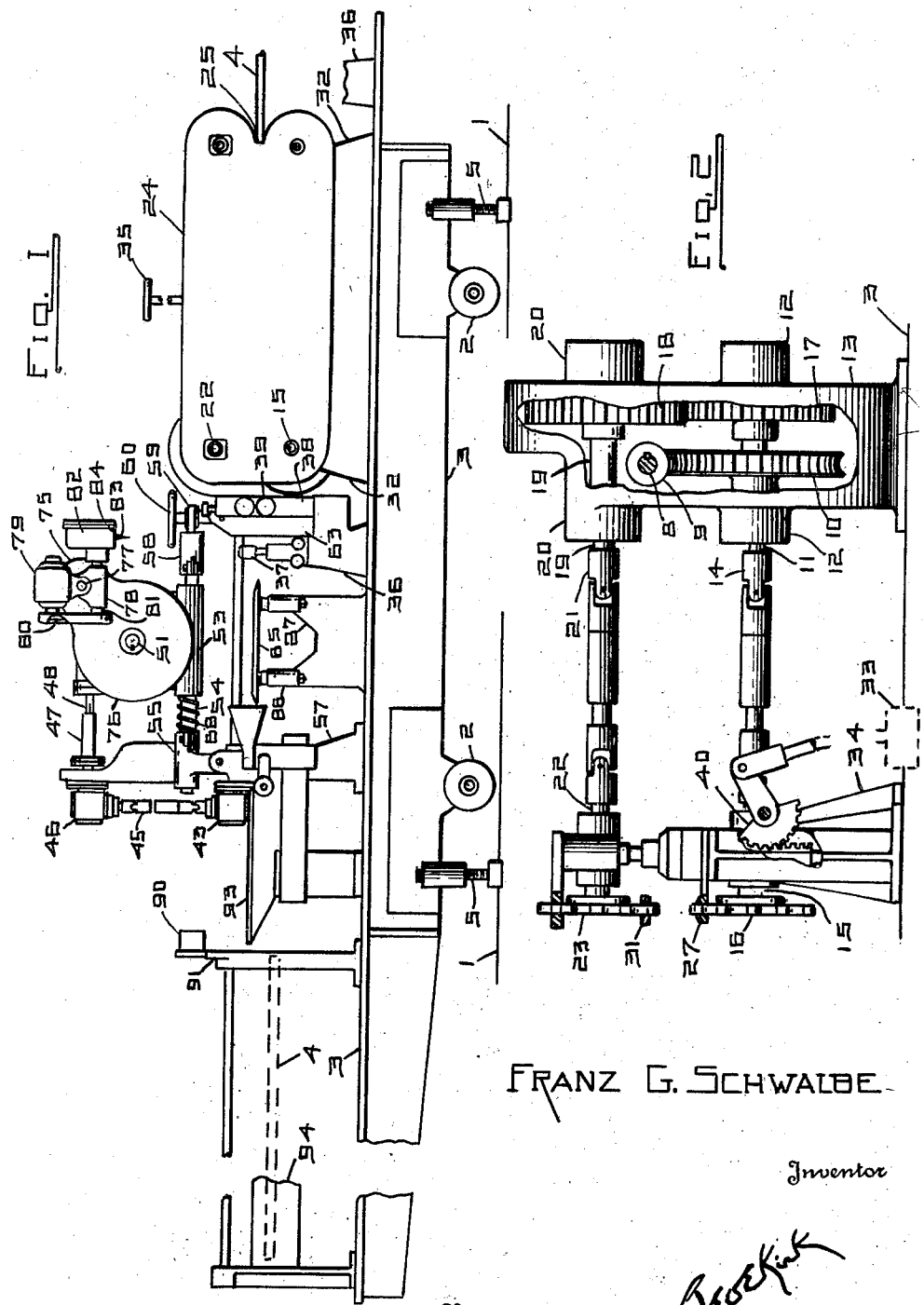
Franz G. Schwalbe
Inventor
By
Attorney

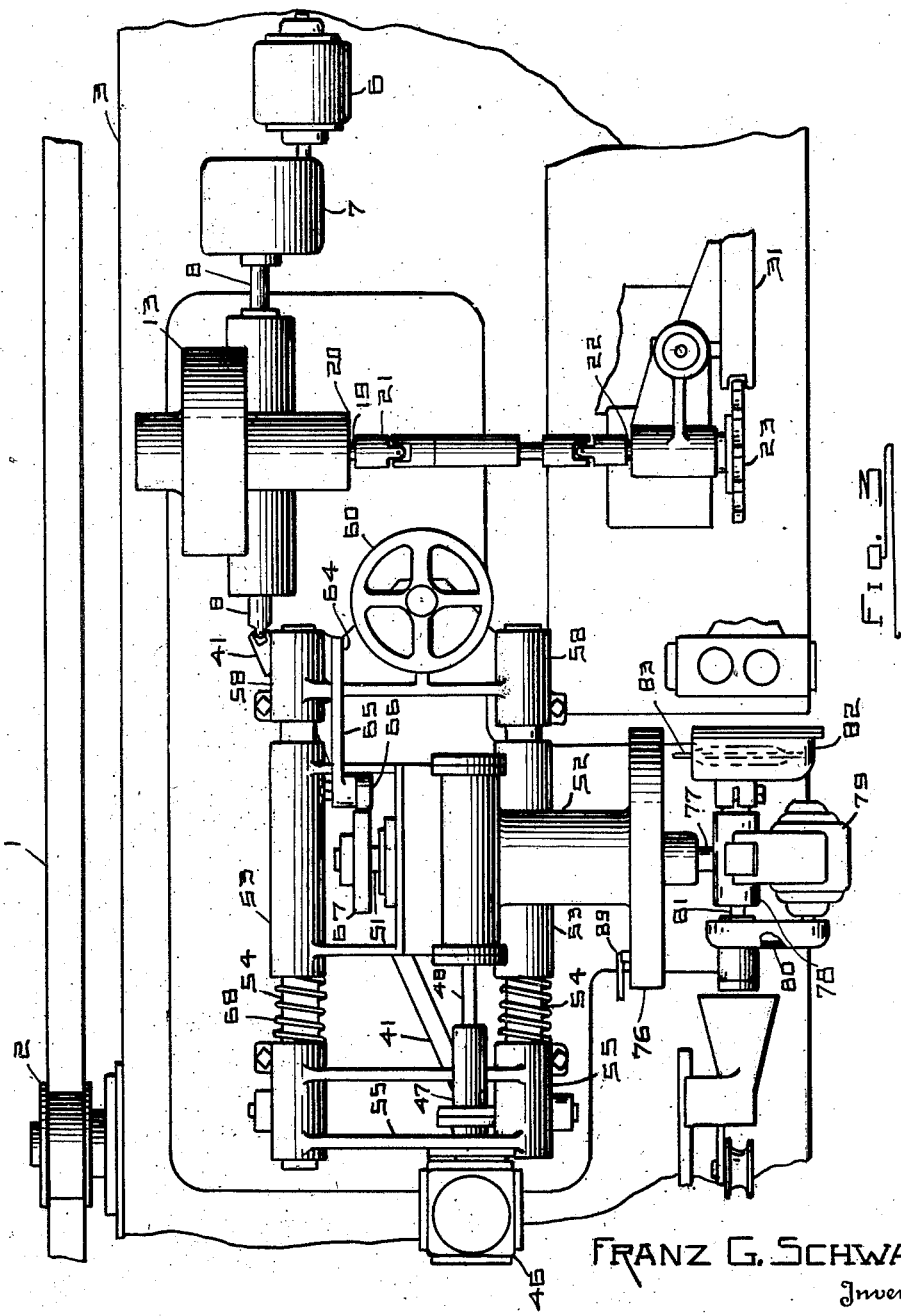
FRANZ G. SCHWALBE
Inventor

Aug. 24, 1948.  F. G. SCHWALBE  2,447,962
CUTOFF MACHINE
Filed May 31, 1943  3 Sheets-Sheet 3
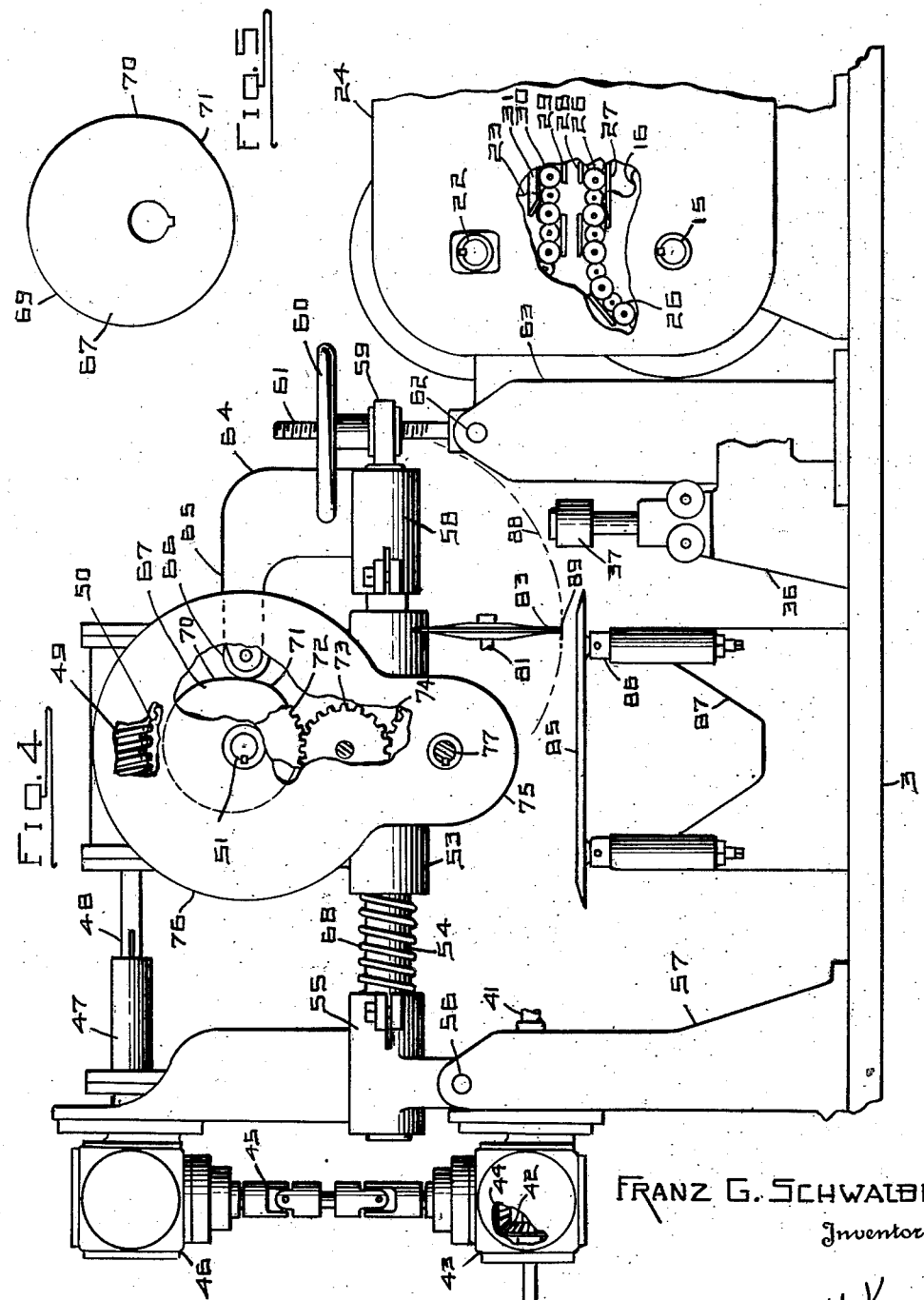
Franz G. Schwalbe
Inventor
By
Attorney Patented Aug. 24, 1948

2,447,962

UNITED STATES PATENT OFFICE 2,447,962

CUTOFF MACHINE

Franz G. Schwalbe, Toledo, Ohio, assignor, by mesne assignments, to Toledo Engineering Company, Inc., Toledo, Ohio, a corporation of Ohio Application May 31, 1943, Serial No. 489,115

3 Claims. (Cl. 49—48)

This invention relates to marking, especially as contributing to severing of lengths, from relatively traveling stock therepast, which stock may be in the form of rods, tubes and the like.

This invention has utility in the production of definite sections or lengths of glass, which as hollow may be for glow tubes, fluorescent lighting units, barometers, thermometers, as well as glass bars or stems. The production rate or draw-off in practice runs even above 350 feet per minute where the glass drawing machine may take from a glass tank or furnace. A cut-off machine as disclosed herein is advantageously connected to take the product or stock directly from the draw-off and sever such continuous run of glass into accurate lengths or sections in keeping with the particular job or character of work for the product.

Referring to the drawings:

Fig. 1 is a fragmentary view in side elevation of an embodiment of the invention in association with a machine for the continuous drawing of glass from a molten pool in the forming of rod or tubular stock;

Fig. 2 is a detail view of features of the drive for the tractor which pulls the glass away from the machine located at the glass furnace and serves as a feeder for the cut-off machine of the invention herein;

Fig. 3 is a plan view, with parts broken away, showing the drive for the tractor, and transmission connections therefrom, for actuating in synchronism with the feeding of the glass, the marking or cutting disk of the invention herein;

Fig. 4 is a view on an enlarged scale of portions of the control and transmission of the cut-off machine; and Fig. 5 is a detail view of the cam in the control for the cutter disk.

On glasshouse floor or runway 1 as extending from a pool of molten glass in a tank or furnace, wheels or rollers 2 permit truck 3 to be properly placed to receive glass rod or tube stock 4 in its progress as a continuous endless strip in machine production. With the truck 3 located as desired, jacks 5 are set to take the load of the truck 3 off the wheels and position the truck against shifting. The jacks 5 as in position may be upon runways or tracks 1.

Upon the truck 3 (Fig. 3) is an electric motor 6 having a variable speed reduction drive connection 7 to a shaft 8. The shaft 8 (Fig. 2) has fixed thereon a worm 9 in mesh with a worm wheel 10 fast on a shaft 11 in bearings 12 of a housing 13 mounted on the floor or deck of the truck 3. The shaft 11 has flexible connection 14 to drive a shaft 15 having a sprocket wheel 16 (Fig. 4) fixed thereon. On the shaft 11 adjacent the worm wheel 10 (Fig. 2) is a gear 17 in mesh with a gear 18 of similar diameter and fixed on a shaft 19 mounted in bearings 20 of the housing 13 for the gears 17, 18, worm 9 and worm wheel 10. The shaft 19 reversely rotating as to the shaft 11, has a flexible transmission connection 21 to a shaft 22 for driving adjustable sprocket wheel 23.

A housing 24 has a receiving or intake port 25 for the formed stock 4, say of glass tubing. About the sprocket wheel 16 extends a sprocket chain 26 which in its upper reach from the port 25 (Figs. 1, 4) is sustained by a guide or track 27 positioning its flights 28 in line to serve as stock engaging or gripping means for a tractor or draw-off for the stock having its upper side engaged by similar flights 29 of a sprocket chain 30 directed by a horizontal guide or track 31 parallel to and opposing the track 27. The sprocket wheel 23 propels the upper chain 30 in the same timed and lineal travel rate as the lower wheel 16 actuates the chain 26. There is here provided a draw-off for the continuous glass-forming machine cooperating herein as a supply device for a marking or severing machine as disclosed.

A base 32 (Fig. 1) on the truck 3 mounts the wheels carrying the sprocket chains 26, of the draw-off or feeder. Additional intermediate uprights 34 locate the guide 27 and the housing 24 (Fig. 1). A hand wheel 35 as rotated may lift or lower the chain 30 and its mounting, and thus is operable to vary the spacing between the tracks or guides 27, 31, thereby to hold the upper sprocket chain 30 at the desired adjusted position as to the lower sprocket chain 26, in order to draw or convey for the proper diameter of the stock 4. Uprights 36 (Figs. 1, 4) are brackets or pedestals from which rise stems forming bearings for guide rollers 37 located one on each side of the stock 4 as coming to and passing from the housing 24. The stock 4 is accordingly delivered to align with the chains 26, 30, to pass between the opposing reaches thereof, with such line of direction for travel maintained in the transit of the stock 4 from the housing 24. Upright 38 (Fig. 1) mounts horizontal axis anti-friction means or rollers 39, also for properly directing the line of transit for the stock 4. Segment lever 40, operated by a weight 33 provides automatic yieldable release action at the tractor (Fig. 2), adjusted by the handwheel 35. The action of the weight 33 is not to lift the wheel 23 and the chain 30, but, at the various adjusted positions effected therefor thru the hand wheel 35, avoids having such held position positive. Accordingly, the weight 33 in its automatic yielding release is a counterweight controlled to have the chain 30 contact the stock 4 sufficiently to maintain traction alignment with the load weight of the wheel 23 and the chain 30 sufficiently neutralized by the weight 33 that distortion strains may not come therefrom to the stock 4.

Drive for the cut-off mechanism

The shaft 8 as extending past the worm 9 has a flexible connection 41 (Figs. 3, 4) to a bevel gear 42 in a housing 43, where, thru a bevel gear 44 and an upwardly extending flexible connection 45, there is transmission thru right angle connection at a housing 46 to rotate a sleeve 47 into which is slidable splined shaft 48. The sleeve 47 provides a rotation drive or actuater for the shaft 48 while permitting relative reciprocation. On the shaft 48 is a worm 49 in mesh with a worm wheel 50 fixed on a shaft or mounting 51 in a bearing 52 having fixed therewith a pair of guides 53 slidable on fixed rods 54 mounted in a first frame member 55 upwardly carrying the housing 46 (Fig. 4). The frame member 55 at its lower portion has a pivotal mounting connection 56 with an upright 57 from the deck of the truck 3. The upright 57 mounts the housing 43.

The rods 54 remote from the frame 55, are fixed with a second frame member 58 providing adjusting means having an eye extension 59 adjacent a hand wheel 60 coacting with a threaded stem or shaft 61 extending thru the eye extension 59 and having therebelow a pivot mounting or connection 62 at an upright 63 from the floor of the truck 3. Operation of the handwheel 60 to rock the frames 55, 58, and therewith the bearing 52, is permitted by the flexible connection 45.

Rising from the frame 58 is an arm 64 having an offset or overhang portion 65 horizontally extending toward the shaft 51 and terminally carrying a roller 66. A cam 67 (Figs. 3, 4, 5) fixed on the shaft 51 is thrust against the roller 66 by compression helical springs 68 on the rods 54 between the guides 53 and the frame 55. The cam 67 has a major extent lesser radial magnitude portion 69 say of about 300°, a different radial magnitude portion 70 from the longer radius terminus of the portion 69, of about 40° and an additional short radial magnitude portion 71 connecting the portion 70 with the short region of the portion 69, thereby completing the cam 67. The cam 67 is mounted on the shaft 51, which is not the axial center of the cam arc portions 69, 71.

The orbit for the cutter

Fixed on the horizontal shaft 51 remote from the cam 67 is a gear 72 (Fig. 4) in mesh with an idler intermediate gear 73 to drive a gear 74 in lobe or arm 75 of a housing 76 for these gears. The housing 76 swings about the horizontal axis of the shaft 51 in carrying the parallel shaft 77. The mesh relation of these gears is such that the gear 74 has 1 to 1 speed ratios with the gear 72. With the gear 74 fixed with additional shaft 77 rotatable in the housing 76, the shaft 77 and the lobe 75 swing about the shaft 51 as an axis as a sort of planet timed for one rotation of the gear 74 in the reverse direction as it travels once about the sun gear 72 of this planetary gearing in which gear train the horizontal shaft 77 coacts with the housing 76, 75, and the housing is rotated. This means that the shaft 77, in effect has no rotation, but only a revolution with the same side of the shaft 77 at all times toward the shaft 51. The lobe or housing 75, 76, in its rotation with the shaft 51, has such relatively to the bearing 52.

Rotation drive for the cutter disk

Fixed against rotation as to the shaft 77 and firmly mounted thereon is a frame or bracket means 78 (Fig. 1) mounting electric motor 79 having belt drive or transmission connection 80 to horizontal shaft 81 carried by the frame 78 on the opposite side of the shaft 77. As protruding from the frame 78 away from the belt 80, there is a housing 82 fixed with the frame 78 partially enclosing cutter or marker disk 83. The shaft 81 provides a support for the disk or tool 83 clamped thereon. The travel of the at-all-times approximately horizontally extending axis of the tool is in a vertical plane from the strip stock 4. Window portion 84 of the housing 82 leaves the disk 83 exposed. The formed glass stock as in transit to and past this marking or cutting device, has in line with its travel direction an alignment maintaining means or support 85 (Fig. 4) having an adjustable mounting 86 from upright means 87 rising from the floor of the truck 3.

The timed cut-off

The clockwise rotatable cam 67 in the relatively long interval from the portion 70 allows for a gradual extension of the springs 68, in acting on the shaft 51 between the guides 53 and the rods 54. In this interval, it is to be noted that the roller 66 is gradually coming to a shorter radius portion of the cam 67 as to the shaft 51. That is, the cam 67, as away from the face portion 70 and active at the face portion 69, is not thrusting the roller 66, but the cam is reducing its active face portion diameter from the shaft 51 for the shaft 51 to be moved more close to the roller 66. Notwithstanding the mass of the outboard mounting for the disk 83 and its rotation driving means, this travel of the guides 53 along the rods 54 in carrying the shaft 51, is stabilized against vibration, even at a cycle per second and faster, such as to approach 100 R. P. M. The long interval portion 69, has therefrom the relatively short portion 71 to locate the disk cutter 83 in position first to engage and move slightly toward and peripherally into definite marking contact with the stock, rod or tube. The succeeding sequence is for the common transit travel with or in synchronism as to speed with the stock, or approximately therewith. This occurs because the interval portion 70 is of constant radius. As this marking or cutting work is achieved, the merging therefrom of the longer cam portion 69 allows the springs 68 to bring the marking disk 83 gradually to take its swing about the arc to thereafter again enter upon the starting position for a repetition of its cycle of operation. It is thus seen that the orbit or control for the rotary cutter of marker 83 as controlled by the cam 67 is for the cam portion 71 to direct the cutter 83 into the desired depth of cutting or marking relation with the stock while proceeding with the stock, thus to localize the region of the marking or cutting. This depth of marking or cutting is continued for the succeeding portion 70 in the clockwise rotation (Fig. 5). As the stock leaves the region of the cutter 83, the cam portion 69 retracts the cutter 83 for the repetition of the cycle of operation at a succeeding definitely predetermined distance from the previous marking or cutting of the strip stock.

The common drive 6 for the feeder chains 26, 30, is to establish a constant and uniform speed for the horizontal reach at the pitch diameter for the sprocket wheel 16. Coincidental therewith is the speed established by way of the shaft 8 as also driving the shaft 51 and the cam 67, to fix the timed relation of the frequency of approach in uniform succession to the line of travel of the stock 4. There is thus maintained a synchronism or a predetermined inter-connecting means for establishing accurately definite lineal sections upon which the disk 83 acts.

The adjustments 35, 40 compensate for required gripping of the variation in stock handled. The handwheel 60 not only conforms in placement to the dimension of stock, but may be an adjusting means to take up for new disk 83, or wear, or pitting of the disk 83 in use. The general path orbit described by the disk 83 is in the region of a clockwise path 88 (Fig. 4). The shaft 77 is an offset axis for the frame 78 eccentric of the shaft 51, with the frame 78 so controlled from the transmission thereto as to maintain the shaft 81 in a general horizontal direction at all times.

The rotating housing 76 (Fig. 3) carries a lug, thereby in its swing it is effective to act upon a switch 89 (Fig. 3) to energize a solenoid 90 (Fig. 1). The solenod 90 as thus energized acts to drop a finger 91 in a region on the stock 4 as just beyond a marking or nicking thereof by the disk 83. This knock or shock from the stroke of the finger 91 against the glass stock 4, as extending beyond the marking weakness, completes the severance therefrom of the beyond-the-marker-portion of the glass as a prescribed length. The length of glass 4 as leaving the way 93 in much of the practice tends to break off of its own overhang weight and fall upon receiving chute 94. Accordingly the finger 91 is a safeguard to complete severance initiated by the disk or marking tool 83.

It is to be noted in the embodiment herein that there is quite a mass of material mounted on the shaft 51 which carries the cutter 83 to describe the orbit 88. The gear 72 (Fig. 4) is keyed to the shaft 51, which has the boss or hub portion of this gear 72 exposed in protruding thru the housing 76, as is also the case for the boss or hub of the gear 74 on the shaft 77. Furthermore, with the lineal travel rate for the stock in the range 10' per second, there is considerable momentum for this traveling mass as including the disk cutter 83. Under the invention herein, this mass approaches a constant or approximately uniform velocity in its closed circuit path or orbit 88. The functioning part of this orbit 88, as herein disclosed is glass contact region 89 of very minor lineal extent as to the orbit, but is of the duration of contact for the tool or cutter 83 with the work or glass 4.

What is claimed and it is desired to secure by Letters Patent is:

1. A cut-off machine for horizontally-continuously-traveling strip stock, comprising a marking tool, bracket means providing a support for the tool, a horizontal shaft, planetary gearing actuated by the shaft rotation, a housing for and rotated by the gearing, said housing including an arm, and an additional shaft protruding from the arm of the housing and connected to be actuated from the gearing at a transmission rate to revolve the bracket means one-to-one relatively to the rotation of the housing and to hold an approximately horizontal direction for the bracket means toward the tool in a vertical plane from the strip stock.

2. A cut-off machine for horizontally-continuously-traveling strip stock, comprising a marking tool, bracket means providing a support for the tool, a horizontal shaft, planetary gearing actuated by the shaft rotation, a housing for and rotated by the gearing, said housing including an arm, an additional shaft protruding from the arm of the housing and connected to be actuated from the gearing at a transmission rate to revolve the bracket means one-to-one relatively to the rotation of the housing and to hold an approximately horizontal direction for the bracket means toward the tool in a vertical plane from the strip stock, a frame mounting the horizontal shaft, and means for vertically adjusting the frame and thereby vary the proximity of the tool to the strip stock.

3. A cut-off machine for horizontally-continuously-traveling strip stock, comprising a marking tool, bracket means providing a support for the tool, a horizontal shaft, planetary gearing actuated by the shaft rotation, a housing for and rotated by the gearing, said housing including an arm, an additional shaft protruding from the arm of the housing and connected to be actuated from the gearing at a transmission rate to revolve the bracket means one-to-one relatively to the rotation of the housing and to hold an approximately horizontal direction for the bracket means toward the tool in a vertical plane from the strip stock, a frame mounting the horizontal shaft, a cam on the shaft and spaced from the housing, and an additional frame including a roller coacting with the cam to vary the movement of the tool in said plane.

FRANZ G. SCHWALBE.

REFERENCES CITED

The following references are of record in the file of this patent:

UNITED STATES PATENTS

| Number | Name | Date |
| --- | --- | --- |
| 1,220,201 | Danner | Mar. 27, 1917 |
| 1,242,478 | Rosewarne | Oct. 9, 1917 |
| 1,585,896 | Danner | May 25, 1926 |
| 1,647,352 | Halstead | Nov. 1, 1927 |
| 1,868,397 | Salomon | July 19, 1932 |
| 2,290,837 | Stuckert | July 21, 1942 |
| 2,306,721 | Forter et al. | Dec. 29, 1942 |
| 2,332,013 | Rudert et al. | Oct. 19, 1943 |